United States Patent Office 3,039,839
Patented June 19, 1962

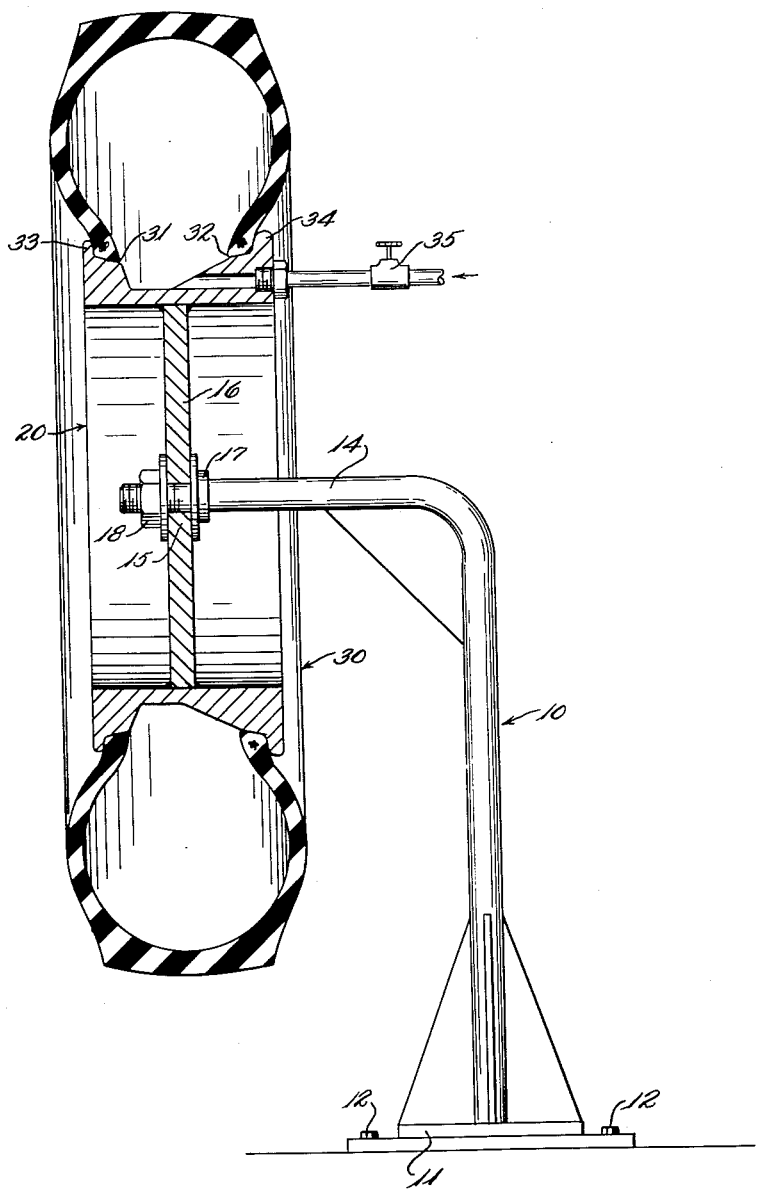
June 19, 1962    H. H. WATERS ETAL    3,039,839
METHOD OF MAKING TIRES
Filed Nov. 29, 1955
INVENTORS
HERBERT H. WATERS
JAMES R. DIECKMANN
BY
W. A. Fraser
ATTY.

3,039,839
METHOD OF MAKING TIRES
Herbert H. Waters, Akron, and James R. Dieckmann, Cuyahoga Falls, Ohio, assignors to The Firestone Tire and Rubber Company, Akron, Ohio, a corporation of Ohio
Filed Nov. 29, 1955, Ser. No. 549,853
1 Claim. (Cl. 18—53)

This invention relates to improvements in the art of building pneumatic tires and more particularly to a method of building such tires using nylon cord fabric, or other fabric having shrinkage characteristics similar to nylon, for the strain elements in the tire plies.

Nylon cord tire fabric presently commercially available has qualities that make it desirable for use in passenger tires. These qualities include high impact resistance, resistance to deterioration from flexing, and high speed characteristics.

Tire manufacturers have succeeded in manufacturing commercially successful tires having nylon body plies employing pot-heater type vulcanizers. Tire molds in pot-heaters are cooled before the vulcanized tires are removed and the tires are retained expanded in the molds until the tires have become substantially cool. Pot heater vulcanization is expensive and only a minor portion of present-day tire production is vulcanized in pot heaters.

In recent years, tire manufacturers have vulcanized the greatest volume of passenger tires at temperatures up to and over 300° F. and have removed these tires from the curing molds without a cooling period. The latest and accepted method of vulcanizing tires employs the use of molds in which the heretofore conventional curing bags are replaced by tire lining diaphragms attached to the curing molds and inserted in and removed from the tire automatically, the tires being removed from the molds without a cooling period and without curing bags therein. These latter type molds are being used in increasingly greater volume. One example of such mold and its operation is disclosed in detail in L. E. Soderquist United States Patent No. 2,715,245 to which reference is had for a description of suitable tire vulcanizing apparatus contemplated by the present invention.

Although the merits of nylon cord tire fabric, and materials having similar characteristics, have been recognized by the tire industry for a long time and great effort has been made to find methods and means whereby such materials could be used not until the present invention have tires using nylon or similar cord fabric been successfully manufactured by a method involving removal of the tires from their vulcanizing molds without a cooling period.

Heretofore, when nylon tires were removed from their molds with the tire as hot as the temperature at which nylon shrinks the nylon cord in the tire plies would shrink and distort the tire from its molded shape. This distortion was so extreme that the tires in which it occurred were not saleable.

Referring now to nylon cord fabric specifically, for purpose of illustration, but without limitation to that exact material, it is pointed out that nylon cord for tires is manufactured with a drawing stretch of about 400%. Heretofore, tire manufacturers have found it necessary to subject this cord to additional stretch, usually about 12%, in order to prevent tires in which such cord was used from "growing" or increasing in size when in service. Tire growth, if excessive, causes tire failures due to tread cracking, ply separation and in other ways. The said additional stretching of the commercially available nylon cord mentioned heretofore has been found necessary to reduce tire growth. This material is of the memory type and heretofore shrunk when the tires were removed from the molds at temperatures in excess of 200° F. which is well below the temperature of a tire removed from the mold without a tire cooling period.

It will now be seen that prior to the present invention the advantages of nylon cord tire fabric were not available to the tire industry without resort to the expensive expedients of cooling tires in the vulcanizing molds while the tires still subjected to internal pressure as is the case when tires are vulcanized in pot heaters. It has been known in the tire industry that tire jacket-type molds, such as the well known Bag-o-Matic vulcanizers illustrated in said Soderquist Patent No. 2,715,245, sold by McNeil Machine and Engineering Co. of Akron, Ohio, which vulcanizers are of the type from which tires are normally removed without a cooling period, could be cooled, before the tires were removed, by exhausting the steam from the jacket of such molds and circulating a cooling fluid therethrough. Such cooling is time consuming and expensive and accordingly its avoidance is desirable.

It is an object of the present invention to, and it does, solve the problem of using nylon and similar cord tire fabric for passenger tires vulcanized in molds without a tire cooling period within the mold as will now be explained.

Applicants prefer to omit the second stretching of the nylon cords mentioned hereinabove as being about 12% and to rubberize the cords as received from a supplier by conventional manner of preparing cord tire fabric plies. The tires are also fabricated on a tire building drum in a conventional manner except, as applicants prefer, if said secondary stretch of the cords is omitted, then applicants change the width of the tire bead set on the tire building drum to a narrow width and thereby increase the molding stretch of the tire. By molding stretch of a tire is meant the increase in the distance between the beads of a tire, measured on the inside of the tire, that occurs during the molding and vulcanization of the tire in a tire mold. The narrow bead set is such as will impart a tire molding stretch to the cords approximately equivalent to the 12% stretch omitted before cords are rubberized and thereby the previously discussed objectionable tire growth, in service, is avoided, as will be seen as the description proceeds. No change in the conventional manner of processing the tires until they are removed hot from the vulcanizing mold is contemplated. Upon such removal of the hot tires from a mold such as referred to above the present invention departs from the conventional method by subjecting the tires to a novel treatment, namely, the tires are promptly mounted on an inflating rim, as explained hereinafter, and, for example, if a tire be an 8.00–15 size, it is, before substantial cooling, inflated to an internal pressure of approximately thirty pounds and this pressure retained in the tire until the temperature of tire falls below the temperature at which the nylon cords will heat shrink, which temperature is approximately 200° F. The tires are retained in their molded form by said internal pressure during this cooling period after which they are removed from the inflating rims. Applicants have discovered that tires made of nylon cord tire fabric and manufactured as just described overcomes the objectionable shrinkage of the cords in the tires described hereinabove and overcomes objectionable tire growth when the tires are run in service.

It is pointed out that the tires are removed from their tire molds while the tires are at vulcanization temperature. Rubber is a poor conductor of heat and the thick tread portion of the tires continue to vulcanize for a period after removal from the molds. Where non-shrinkable, tire reinforcing material is used, this continuing vulcanization is not objectionable and makes possible a reduction of vulcanization time in the mold. However, in the case of nylon tires, if the nylon cords shrink and draw the center of the tread radially inwardly, as it does if not restrained, then the tread rubber vulcanization is completed at a substantially reduced diameter than that at which it runs inservice. Further, cross-sectionally the shrunk tread is concave, whereas in service it arches, which results in premature tread cracking. Obviously, this fault is eliminated by applicants' method wherein the tire's vulcanization is completed in its full molded size and shape, or somewhat larger according to internal pressure exerted after tires have been removed from their molds.

Another advantage of applicants' invention is that the nylon cords are disposed in the tire under such stretched condition that they will exert an appreciable shrinkage tension when in tire service and subjected to a temperature of 200° F. Passenger tires, in service, when run at speeds of 70 to 90 miles per hour reach temperature, in the tire crown portion of the tire, in excess of 250° F. At this speed and temperature tire treads are subject to "chunking." "Chunking" is a term used by tire engineers to describe the phenomenon of pieces of rubber being thrown from the tire tread. The present invention substantially reduces "chunking" although in what manner has not been positively established. It is known, however, that the tread of a tire mounted on an automobile traveling at high speed is under extreme stresses as it leaves its road contact. It is believed that the shrinkage characteristic of nylon, in tires built by applicants' method, at the temperature of tires run at high speed effects a shrinkage movement of the tire cords in a direction opposite to the movement of the tread material caused by said high speed and the tread's contact with the road. It is further believed this relative movement of the nylon cords and the tread rubber relieves the stresses in the tread rubber to an extent sufficient to substantially reduce tread chunking. Whatever the proper explanation of reduced chunking in tires built in accordance with the present invention may be, such improvement is an important contribution to the art whenever tires are removed from vulcanizing molds without a cooling period before the tire's removal.

It is obvious that the tire cooling the present invention includes may be done in numerous ways such as providing rims adopted for quick mounting and demounting of the tires with means for subjecting the inner, or outer, or both inner and outer surface to a cooling medium while the tire is subjected to internal pressure, as illustrated in the accompanying drawing, to which reference is had, and wherein a stand 10, has a base 11 bolted to floor as by bolts 12, a laterally extending arm 14 on which is mounted a hub 15, of a spider or wheel 16. Arm 14 is provided with a shoulder 17 against which hub 15 is abutted and retained by a nut 18 in threaded relation in a free end of said arm which extends through and projects beyond said hub as will be understood by reference to the drawing. A one piece drop-center rim 20 is permanently or removably mounted on said spider or wheel 16 to receive a hot tire 30 immediately upon the tires removal from a hot mold in which the tire has been molded and at least partially vulcanized. By partially vulcanized is meant a degree of vulcanization less than complete vulcanization of the rubber of the tire. Vulcanization is recognized in the rubber industry as a progressive chemical change of a rubber compound from a raw rubber state to a desired optimum state, so called cured state. Beyond this fully vulcanized state the rubber is considered to be over cured which usually is undesirable. Rim 20 is provided with bead seats 31, 32 having side flanges 33, 34 respectively. For ease of mounting tires on said rim flange 33 has an outside diameter somewhat less than the outside diameter of flange 34. At any rate it is to be understood that flanges 33 and 34 are such that the tire to be mounted on rim 20 may be conveniently and quickly so mounted. The present invention contemplates tubeless tire although not necessarily restricted to such. If tire 30 is tubeless as illustrated rim 20 is connected to an air line that communicates with the inside of tire 30 as illustrated. As soon as hot tire 30 is mounted on rim 20 inflationary air is turned into the tire by means of a valve 35 which may be operated manually. Obviously such inflation may be initiated automatically and controlled automatically both as to the maximum inflationary pressure to which the tire is subjected and the time to which the tire is so inflated. It will be obvious to those having an understanding of the art that the necessary cooling period for the tires can be shortened by various expedients, not shown, such for example, as blowing room temperature air against the outer surface of the tire by fans or from air nozzles connected with a suitable source of air under pressure.

While the invention has been described particularly in reference to the known characteristics of nylon which may be more specifically identified as nylon 6–6, it is useful with other plastics such as nylon 6, or a plastic presently sold in this country under the trade name of Dacron and another sold under the trade name of Caprolactam. It is to be understood that these plastics have been identified to illustrate the usefulness of the present invention but not as a limitation of same. The detailed description of the particular embodiment of the invention described herein is not to be construed as limiting the invention thereto. The invention includes all features of patentable novelty residing in the foregoing description.

What is claimed is:

The method of manufacturing a pneumatic tire, the body plies of which are reinforced with heat-shrinkable fabric cords, which comprises, vulcanizing said tire under heat and pressure in a confining mold, removing said tire from said mold while the tire is still at a temperature at which said cords will normally shrink, inflating said tire with fluid under pressure without external support for the body of said tire and allowing it to cool in said inflated condition to a temperature at which said cords have no appreciable shrinkage and thereafter relieving said fluid pressure.

References Cited in the file of this patent

UNITED STATES PATENTS

| | | |
|---|---|---|
| 1,394,928 | Midgley et al. | Oct. 25, 1921 |
| 1,665,312 | Laursen | Apr. 10, 1928 |
| 1,730,639 | Blaker | Oct. 8, 1929 |
| 1,909,455 | Busse | May 16, 1933 |
| 2,032,508 | Seiberling et al. | Mar. 3, 1936 |
| 2,104,673 | Reiser | Jan. 4, 1938 |
| 2,340,264 | Freeman | Jan. 25, 1944 |
| 2,625,981 | Wallace | Jan. 20, 1953 |